United States Patent [19]
Kahn

[11] Patent Number: 6,140,742
[45] Date of Patent: Oct. 31, 2000

[54] HIGH AUTHORITY ACTUATOR

[75] Inventor: Manfred Kahn, Alexandria, Va.

[73] Assignee: The United States of America as represented by the Secretary of the Navy, Washington, D.C.

[21] Appl. No.: 09/189,676

[22] Filed: Nov. 13, 1998

Related U.S. Application Data

[60] Provisional application No. 60/085,068, May 12, 1998.

[51] Int. Cl.[7] .................................................. H01L 41/08
[52] U.S. Cl. ........................................... 310/328; 310/369
[58] Field of Search .................................. 310/328, 369, 310/330–332, 366, 358

[56] References Cited

U.S. PATENT DOCUMENTS

| | | | |
|---|---|---|---|
| 5,173,605 | 12/1992 | Hayes et al. | 310/332 X |
| 5,214,342 | 5/1993 | Yang | 310/328 |
| 5,332,942 | 7/1994 | Rennex | 310/328 |
| 5,693,997 | 12/1997 | Griffith et al. | 310/328 |

*Primary Examiner*—Mark O. Budd
*Attorney, Agent, or Firm*—Barry A. Edelberg; George Kap

[57] ABSTRACT

An actuator composed of a plurality of telescoping piezoelectric members which produces a displacement that is the sum of the length of the members.

11 Claims, 3 Drawing Sheets

HIGH AUTHORITY ACTUATOR

RELATED APPLICATION

This patent application is based on and is claiming the benefit of the provisional patent application entitled "High Authority Actuator" which was filed on May 12, 1998, bears application No. 60/085,068, and is herein incorporated by reference.

BACKGROUND OF THE INVENTION

1. Field of Invention

This invention pertains to a device which relies on a piezoelectric material to produce a spatial displacement in response to an electrical input.

2. Description of Prior Art

Actuators are devices which can translate electrical energy to mechanical energy and sensors are devices which can translate mechanical energy to electrical energy.

The devices based on piezoelectric material operate on the principle of applying an electrical field to a block of the material wherein the material produces a proportional displacement, with the proportionality characterized by the piezoelectric activity coefficients $d_{33}$, $d_{31}$ and others. The first digit denotes the poling direction, whereas the second digit denotes the displacement direction. So if a vertically disposed block of piezoelectric material is poled vertically and the displacement utilized is also vertical, then the piezoelectric activity coefficient for this mode of operation is $d_{33}$. If the vertically disposed block is poled horizontally through its thickness and displacement is sensed in the vertical direction, the appropriate piezoelectric activity coefficient for this mode of operation is $d_{31}$. The magnitude of $d_{33}$ in the piezoelectric material lead zirconate titanate (PZT) is equal to approximately 2.5 times that of its $d_{31}$ coefficient.

The prior art actuators, relevant here, are used in applications varying from vibration damping to noise suppression to the shaping of air foils, in the approximate frequency range of less than 1 Hz to 10,000 Hz.

The prior art actuators operate on the principle that the application of a driving voltage produces a lengthwise displacement which is proportional to the length of the actuator. Thus, the longer the actuator, the greater the displacement. For instance, a driving voltage of 1000 volts applied to a 100 mm long actuator can produce a displacement of approximately 0.05 mm.

The problem with a 100 mm-long actuator is that it may be too long for an intended application. This invention makes it possible to reduce the external length of the actuator to the desired value and yet obtain the displacement obtained, for example, by a 100 mm long, one-piece actuator.

OBJECTS AND SUMMARY OF THE INVENTION

It is an object of this invention to make a compact device made of or based on a piezoelectric material which device produces a displacement comparable to a more extended or elongated actuator.

It is another object of this invention to fabricate a piezoelectric actuator that has no intrinsic size limitations.

It is another object of this invention to make a solid state piezoelectric actuator that operates by virtue of a geometric displacement multiplication.

It is another object of this invention to make a piezoelectric actuator that is characterized by a telescoping tube design.

These and other objects of this invention can be attained by making an actuator composed of two or more tubes or open ended boxes made of a piezoelectric material disposed within each other and mechanically connected to add the displacements of the individual tubes or open ended boxes.

DESCRIPTION OF THE PREFERRED EMBODIMENTS

This invention pertains to a device for obtaining a displacement caused by an electrical input. More specifically, this invention pertains to a telescoping actuator comprising a plurality of tubes or open-ended boxes disposed one within each other, made of a piezoelectric material which produces a displacement in response to a driving voltage. The latter can be applied either along the length of each tube or across the tube wall. If the driving voltage is to be applied along the length of the tube, electrodes are provided on top and bottom surfaces of each tube. Before use the tube is "poled" with these electrodes by applying an electrical field of about 2500 v/mm while the tube is immersed in oil at 85° C. During subsequent use, the driving voltage is applied to these electrodes, giving a driving field directed along the length of the tube. This is referred to herein as the $d_{33}$ operating mode. If the driving voltage is to be applied across the wall thicknesses of the tubes, the tube walls instead of the tube ends have to be electroded first, a D.C. "poling" field of 2500 v/mm is then applied across the tube wall with these electrodes and the driving voltage is then also applied to them. The walls will then either expand or contract, depending on the poling directions. The lengthwise displacement of the tube will then be about 40% of the radial displacement multiplied by the ratio of the tube length to its wall thickness. When the driving voltage is applied across the wall thickness, the operation is referred to herein as being in the $d_{31}$ mode.

There are advantages and disadvantages to $d_{33}$ and $d_{31}$ modes of operation. The $d_{33}$ mode of operation produces a displacement that is about 2½ times larger than the displacement in the $d_{31}$ operation mode. However, since the driving field is given in volts per millimeter, and the tube length is usually many times the wall thickness, the $d_{33}$ mode of operation will require driving voltages that are often very high. This may be problematic for that reason alone. The high driving voltages in the $d_{33}$ mode of operation mandate a spacing between the tubes that needs to be greater than in an actuator operated in the $d_{31}$ mode.

Figure 1:
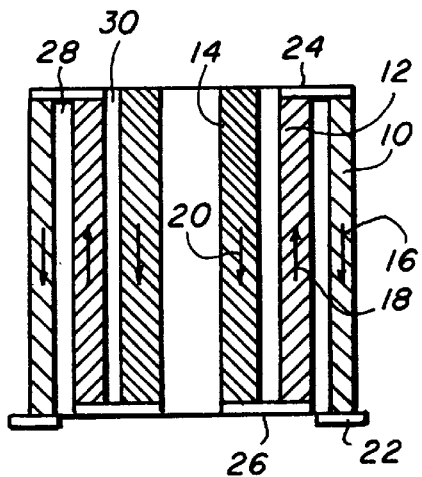
FIG. 1 is a cross-sectional view of an actuator of this invention composed of three spaced concentrically located tubes disposed in the same horizontal plane when not in operation and coupled by mechanical interconnective members.
Figure 2:
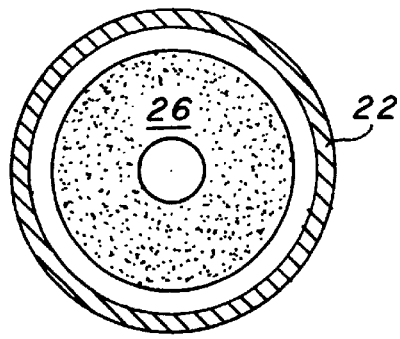
FIG. 2 is the bottom view of the actuator shown in FIG. 1.
Figure 3:
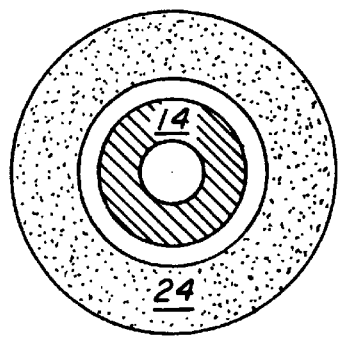
FIG. 3 is the top view of the actuator shown in FIG. 1.
Figure 6:
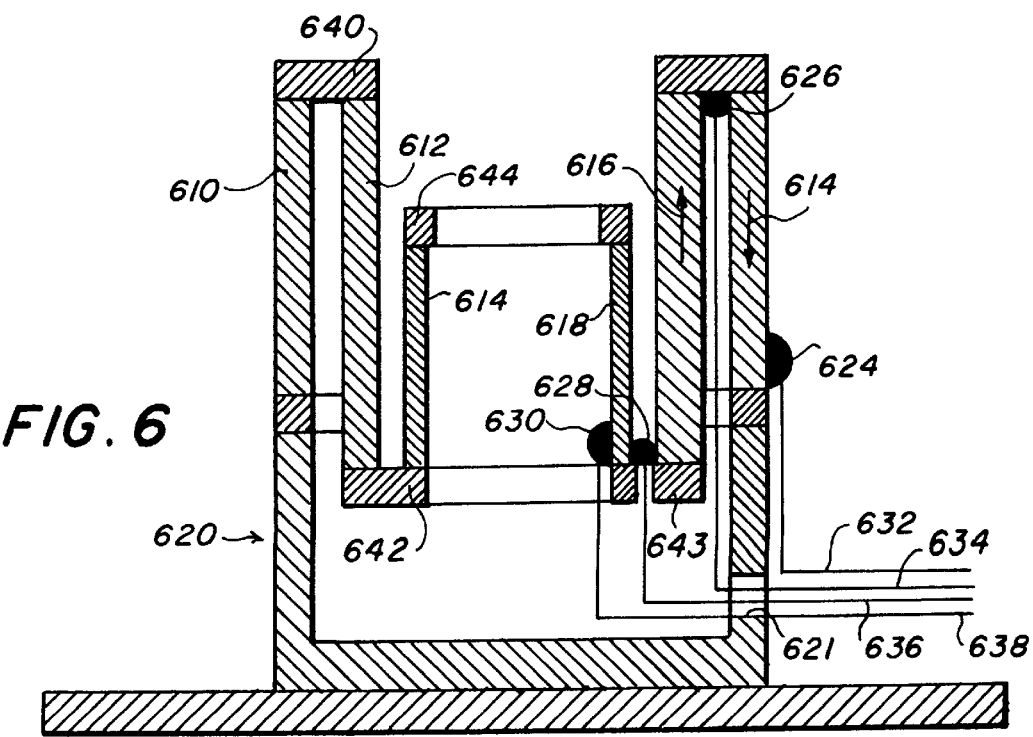
FIG. 6 is a cross-sectional view of a 3-tube actuator that has each tube operating in the $d_{31}$ mode and being the actuator of the Example.

The actuator of this invention is shown in FIGS. 1–3, where FIG. 1 is axial cross-sectional view of the telescoping tubular actuator, FIG. 2 is the bottom view and FIG. 3 is the top view of this actuator. As shown in FIG. 1, the vertically disposed actuator is composed of 3 concentric tubes 10, 12, and 14 arranged within one another about the same axis and at about the same horizontal plane before any displacement. The tubes are elongated cylinders of different wall thickness with the wall thickness typically increasing from the outer to the inner tubes. However, the wall thickness can be the same in any or all tubes. For optimum force output, the radial cross-sections of all the tubes in an actuator should be equal, since all the tubes are mechanically connected in series. The length of the tubes is often about the same, but it can differ, as shown in FIG. 6. In an actuator of this invention, where the tubes are in series mechanically, the tube with the smallest diametric cross-sectional area determines the mechanical limit or the blocking force of the actuator.

For some operational configurations, it is advantageous for all tubes or open-ended boxes to have the same wall thickness since this will give the same supply voltage magnitudes for the same applied field strength.

The materials from which an actuator of this invention can be made are electrically non-conducting piezoelectric ceramic materials having grain sizes about 0.1 to 75 microns, typically near 3 microns. Any piezoelectric material may be used. Examples of useful ceramics include piezoelectric lead zirconate titanate (PZT) and barium titanate ($BaTiO_3$). Poled piezoelectric material has the ability to produce a mechanical force or deformation when a voltage is applied to it. Its deformation direction is related to the polarity of the applied electric field in respect to that of the poling field.

The tubes, having dimensions to fit into one another, are poled before use in an actuator. Poling is typically done in an oil bath at 85° C. and at an impressed field of about 2.5–3 kv/mm. The purpose of the poling is to align the internal dipole moments in a common direction, parallel to that of the poling field.

As shown in FIG. 1, the poling direction of the outer tube 10 is here downward, as indicated by arrow 16, that of the middle tube 12 is upward, as indicated by arrow 18, and poling direction of the inner tube 14 is downward, is indicated by arrow 20. At the lower extremity, outer tube 10 is attached to an external support 22 and at its upper extremity the outer tube 10 is attached by means of rigid connector 24 to the middle tube 12. At the lower extremity of the middle tube 12, the latter is connected by the rigid connector 26 to the inner tube 14. Tubes 10, 12, and 14 are concentric and spaced from each other by air gaps 28 and 30.

The connectors 24 and 26 are typically electrically inactive, meaning that they are not poled. They can be of same or different material as the tubes. The connectors are rigid structures and are strong enough to support the tubes attached thereto.

The bottom view of the actuator of FIG. 1 is shown in FIG. 2 where support 22, in the form of a ring, is shown outside of the circular connector 26. This connector connects the lower ends of tubes 14 and 12. The top view shown in FIG. 3 shows circular connector 24 outside the inner tube 14.

The actuator shown in FIGS. 1–3 can be operated in either the $d_{33}$ mode or $d_{31}$ mode. When operated in the $d_{33}$ mode, driving voltage is applied across the length of each tube and the displacement will equal to 0.05% of the total length of the tubes, assuming a driving voltage of 1000 volts/mm. The poling electrodes are generally the same as the ones used for connecting driving voltage. The relation of the polarity of the polarization in the center tube to that of its driving voltage is opposite to that of the outside and of the inside tubes. This makes the center tube contract when the inside and the outside tubes expand, and vice versa. Assuming a tube length of 100 mm and a driving field of 1000 v/mm, the voltage across the length of each tube will be 100,000 volts. In the $d_{33}$ operation mode, electrodes are provided at the extremities of the tubes to permit voltage to be applied across the length of each tube.

In the $d_{31}$ operation mode, the poling voltage is applied across the wall thickness of each tube. This poling voltage tends to align the dipole moments within the tube being poled. Also, the driving voltage is applied across wall thickness parallel to the poling direction. Assuming the same driving field of 1000 volts/mm and a wall thickness of a tube of 5 mm, the voltage applied across the wall thickness would be only 5,000 volts. For poling and for the application of the driving voltage across the wall thickness of a tube, electrodes are provided on the outer and inner surfaces of the tube.

As should be now apparent, the driving voltage in the actuator operated in the $d_{33}$ mode is typically very high. However, the displacement of an actuator operated in the mode $d_{33}$ is 2½ times greater than displacement of an actuator operated in the $d_{31}$ mode. Therefore, in an application where only a shorter actuator is required, operation of the actuator might be carried out in the $d_{33}$ mode in order to obtain the larger displacement with a driving voltage that is practical.

Figure 7:
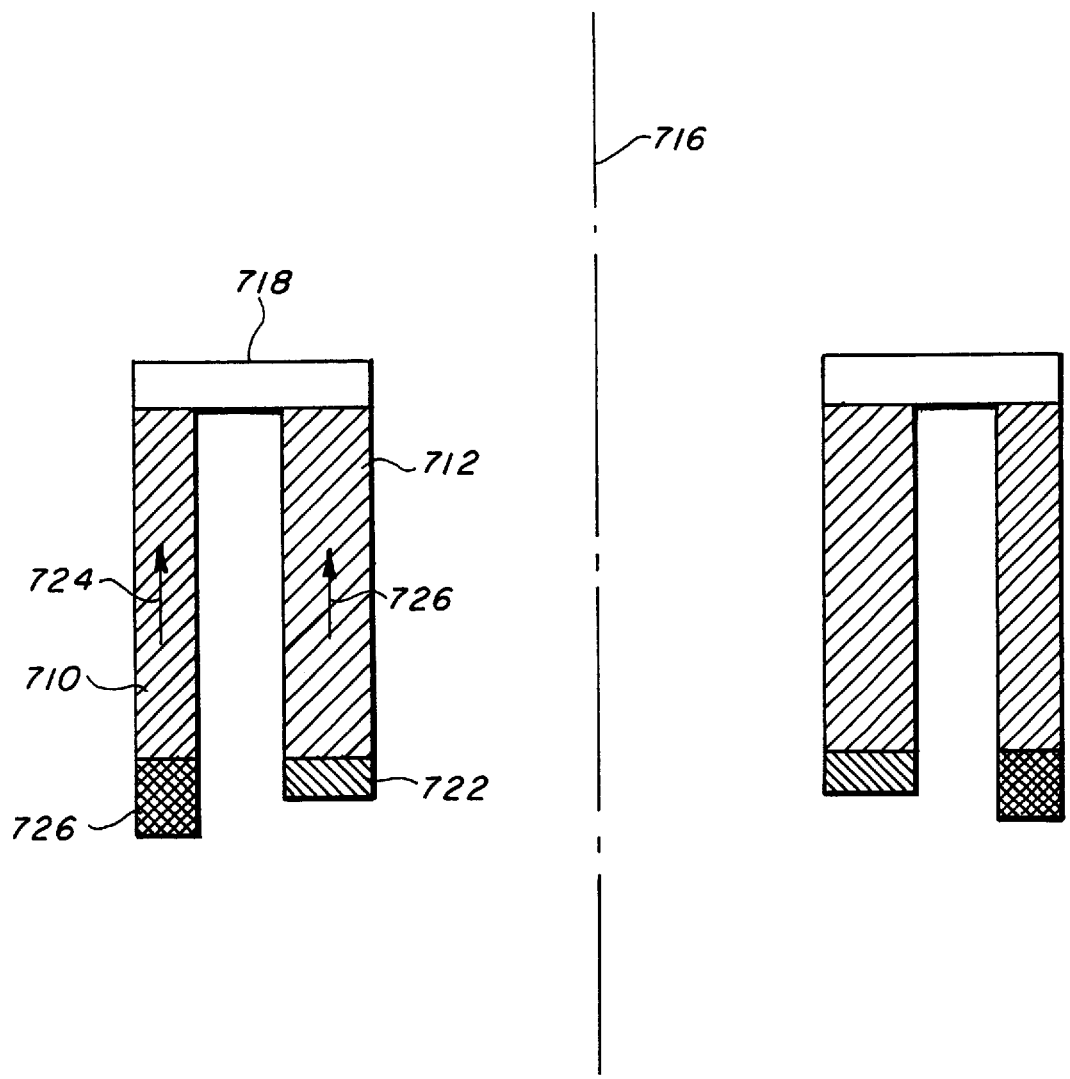
FIG. 7 is illustrates an embodiment wherein the polarization directions in adjacent tubular members are in the same direction.

The polarization directions in adjacent members need not be in opposite directions. FIG. 7 illustrates an embodiment wherein polarization directions in adjacent members are in the same direction. As disclosed in FIG. 7, which is a partial illustration of the embodiment, the embodiment includes outer tube member 710 and concentric inner tube member 712 spaced from the outer tube around central axis 716. The outer and the inner tubes are mechanically connected at the top by electrically non-conducting member 718 in spaced relationship to each other. Outer tube 710 is connected to load 720 at its lower extremity and the lower extremity of inner tube 712 is secured to a stationary or fixed member 722. Outer tube 710 is poled so that its dipole moment is up, as indicated by arrow 724, and inner tube 712 is poled so that its dipole moment is also up, as indicated by arrow 726.

The arrangement shown in FIG. 7 relies on the additive displacement effect of tubes 710 and 712 in order to displace load 720. Both tubes are poled lengthwise in the same direction. Tube 710 is driven with a voltage having a polarity opposite to that of the poling voltage. As a result it contracts lengthwise. Tube 712 is driven with a voltage that has the same polarity as its poling voltage so that it expands lengthwise. Upon actuation, tube 710 contracts and carries with it load 720 upwards and tube 712 expands and further carries with it load 720 upwards. Therefore, the embodiment illustrated in FIG. 7 can be operated to displace load 720 by the additive of the contraction of tube 710 and expansion of tube 712.

Figure 4:
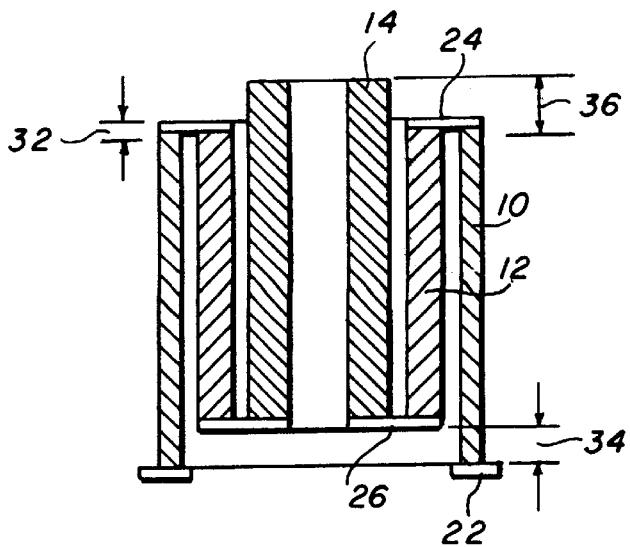
FIG. 4 is the actuation of FIG. 1 after application of a driving voltage showing a displacement of the upper surface of the inner tube which is the sum of expansion of outer tube, contraction of the middle tube, and expansion of the inner tube.

FIG. 4 shows, in axial cross-section, an actuator of this invention in operation. The actuator of FIG. 4 is the same actuator shown in FIG. 1. On application of a driving voltage across either the length or wall thickness of the outer tube, the latter expands and the degree of this expansion is indicated by 32. For a tube to expand when operated in the $d_{33}$ mode, the polarity of the driving voltage must be the same as that of the poling voltage. The tube will contract if the polarities oppose each other. Support 22 is fixed and stationary so any expansion taking place in the outer tube 10 means that the upper end of the outer tube will elevate and carry with it anything affixed to it, as shown in FIG. 4. Connector 24 is attached at the top of the outer and the middle tubes 10, and 12. Therefore, expansion of the outer tube 10 will also elevate the middle tube 12. Application of a driving voltage of a polarity opposite to that it is poled in, across either the length or wall thickness of the middle tube 12, produces a contraction in this tube. The total value of expansion of the outer tube 10 and contraction of the middle tube 12 is indicated by 34. Since the middle tube 12 is rigidly affixed to the inner tube 14 by means of connector 26, any upward movement in the middle tube 12 is translated into upward movement in the inner tube 14. The driving voltage is also impressed across the length or wall thickness of the inner tube 14 in a polarity that is the same it is poled in. This produces an expansion and a further upward displacement of the inner tube 14. Reference number 36 shows the total displacement caused by expansion of the outer tube, contraction of the middle tube, and expansion of the inner tube. Assuming a driving voltage of 1000 volts/mm, the displacement created by the actuator will be 0.05% the combined length of the 3 tubes, assuming $d_{33}$ operation mode. Operating the same actuator in the $d_{31}$ mode will result in displacement of 40% of that incurred in the $d_{33}$ mode.

Typically, tube length varies from 0.2 to 25 cm although shorter and longer tubes can be used. Tube wall thickness can vary from 1 mm to 1 cm although tubes with a thinner and thicker walls can be used. The air gaps between telescoping tubes also vary depending on applied voltages. The typical width of the air gaps in actuators operated in the $d_{31}$ mode may vary from 0.25 mm to 50 mm, although there is no limitation as long as problems do not develop due to breakdown from the voltage employed. Also, the number of tubes employed to construct an actuator of this invention can be odd or even although an odd number of tubes is typically employed for reasons of facilitation. The general rule is that the more tubes are employed, the smaller the height of the actuator will be for a given displacement.

Figure 5:
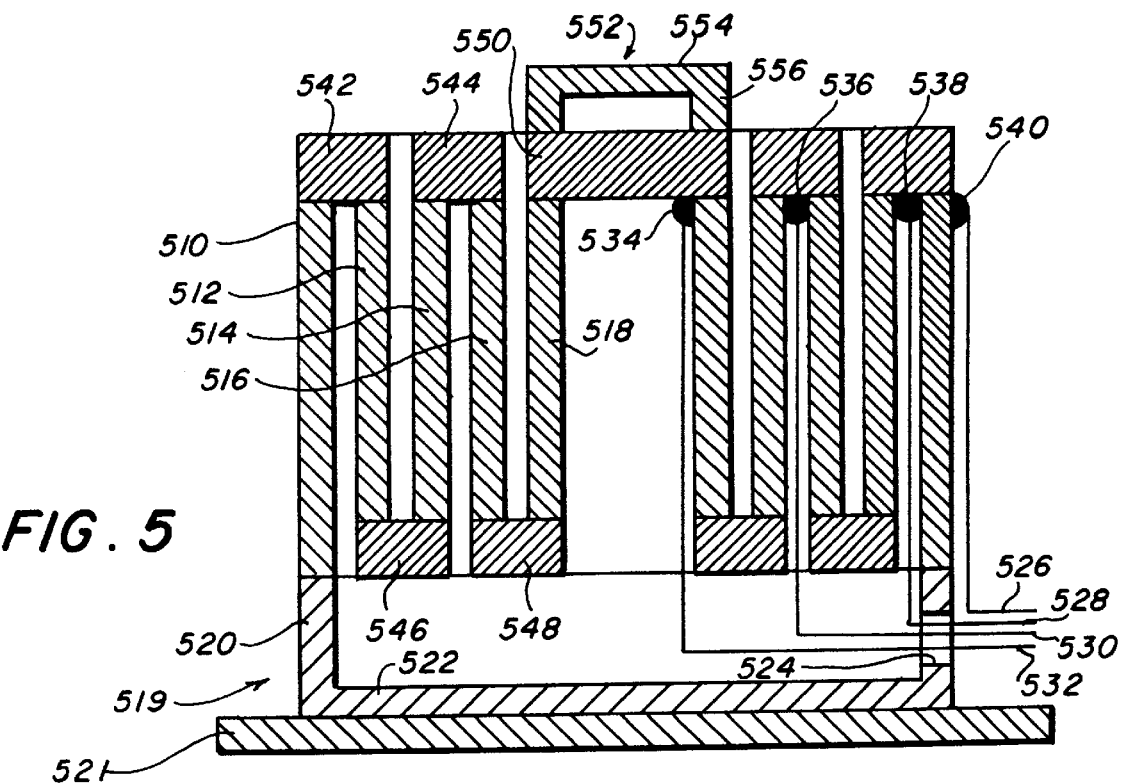
FIG. 5 is a cross-sectional view of an actuator composed of 5 tubes which contribute to the actuator displacement with each tube operated in the $d_{31}$ mode.

FIG. 5 illustrates an actuator of this invention which uses 5 spaced concentric tubes which is operated in the $d_{31}$ mode. FIG. 5 is an axial cross-section of the telescoping tubular actuator of this invention composed of outer tube 510, intermediate tubes 512, 514, 516, and inner tube 518. Inside diameter of tube 510 is the largest, inside diameter of tube 518 is the smallest, and inside diameters of tubes 512, 514, 516 are intermediate the largest and the smallest. All tube wall thicknesses are here the same. This gives the same field strength across each tube wall with the same supply voltage amplitude. Electrodes are deposited on the inner and outer surfaces of the tubes and the poling direction in each tube is the same as the poling direction in the adjacent tubes. The outer tube 510 is disposed on ring 519 having circular vertical wall 520 and horizontal circular disc 522 integral with or connected to the wall 520. The ring 519 is disposed on a flat support surface 521. Opening 524 in wall 520 allows entry into the ring of the electrical lead and whatever else that may be necessary. Leads 532, 530 and 528 pass through opening 524 and deliver driving voltages to contacts 534, 536, 538. Lead 526 connects to contacts 540, 541 and 542. This causes alternate tubes that have all the same polarization directions to expand and contract with the one applied voltage. Connector 542 secures outer tube 510 to the intermediate tube 512 in a fixed, spaced relationship to one another at the upper extremity. Connector 546 secures the two intermediate tubes 512 and 514 at their lower extremity in a fixed, spaced relationship to each other. Connector 544 secures the two intermediate tubes 514, 516 at their upper extremity in a spaced relationship. Connector 548 secures the intermediated tube 516 and the inner tube 518 together in a spaced relationship at their lower extremity. Disc 550 is disposed on the upper extremity of the inner tube 518 which disc provides support for the load bearing structure 552 composed of outer ring 556 siting on the disc 550 and connecting disc 554 spaced above disk 550.

Driving voltage is applied to leads 526, 528, 530 and 532, which pass through the air gap between adjacent tubes, and imparts displacement to each tube. The tubes are connected in the manner described in connection with the actuator of FIG. 1 to take advantage of each expansion and contraction of the tubes to obtain a displacement that is additive thereof. Such on actuator provides displacement in a shorter volume that has a height of a fraction of its untelescoped length.

To obtain the piezoelectric displacements, whether by tube expansion or contraction, each tube is driven with a polarity that is in the same direction or opposes the poling polarity. The blocking strength, defined to be maximum output force, of the actuator of this invention is directly proportional to the diametric or radial cross-sectional area of the tubes and it can be adjusted by using thinner or thicker tubes. When the actuator is designed to keep the diametric cross-sectional area of each tube equal, the inner tubes have thicker walls than the outer tubes. This is not shown in FIG. 5.

Having described the invention, the following example is given as a particular embodiment thereof and to demonstrate the practice and advantages thereof. It is understood that the example is given by way of illustration and is not intended to limit the specification or the claims in any manner.

EXAMPLE

This example demonstrates the telescoping tube actuator of this invention composed of three tubes made of PZT piezoelectric material. The actuator is shown in FIG. 6 and it was operated in the $d_{31}$ mode.

The actuator design shown in FIG. 6 is based on commercially available tubes and is not optimized for force or displacement output. In addition to the different wall thicknesses noted, all tubes in a device optimized for minimum total length would be of the same length.

As shown in FIG. 6, outside tube 610 is concentrically disposed around middle tube 612 which, in turn, is concentrically arranged around the inner tube 614. The width of the air gap between the tubes is 0.3 cm. The tubes were poled lengthwise in oil at 85° C. at a voltage of 2.5 Kv/mm and were constructed as the actuator of FIG. 6 with poling direction indicated by arrows 614, 616, and 618.

The outer tube is disposed on stationary and fixed ring 620 which rests on support 622. Fired silver electrodes were provided on outer and inner surfaces of each tube and conductive epoxy contacts 624, 626, 628, and 630 were affixed. Wires connected to these applied a driving field to these tubes through their wall thicknesses. The driving voltages applied to leads 632, 634, 636, 638 were such that a field of 1000 volts/mm was applied to each tube wall. Leads 634, 636, and 638 passed through opening 621 in ring 620 into interior of the ring and contacted respective contacts 626, 628, and 630. Lead 636 passed through opening 643 in the connector 642 on its way to contact 628. Lead 632 was secured to contact 624 by passing outside the actuator, as shown in FIG. 6.

For the external load to be driven by the actuator's tube expansions and contraction, the outer tube 610 was rigidly affixed to the middle tube 612 by means of connector 640 at the upper extremities of the tubes and the middle tube 612 was rigidly affixed to the inner tube 614 by means of connector 642. Connectors 640, 642 were not poled so that they were electrically inactive.

The tubes of the actuator shown in FIG. 6 were mechanically in series. Contact 626 also connects the inside surface of the outer tube 610 to the outside surface of the middle tube 612. The outside surface of the outer tube 610 was connected to its power supply via contact 624 to lead 632. Contact 628 was electrically connected to both the inside surface of the middle tube 612 and the outside surface of the inner tube 614. Contact 630 was connected to the inside surface of this inner tube 614 and was connected to lead 638.

The arrangement of the tubes in the actuator of FIG. 6 was such that the total available displacement thereof was the sum of expansion of the outer tube 610, contraction of the middle tube 612, and expansion of the inner tube 614. To obtain the same displacement by a prior art actuator, the outside length of the prior art actuator would be the sum of the outer, middle, and inner tubes of the actuator shown in FIG. 6.

The parameters of the actuator of FIG. 6 are given in Table 1 below:

TABLE 1

| Tube | O.dia. (cm) | W.Thk. (cm) | Ht. (cm) | Cap (pF) | K | df (%) | d33 meas | (pC/N) corr | d31 meas | pC/N corr |
|---|---|---|---|---|---|---|---|---|---|---|
| outer | 4.12 | 0.29 | 2.59 | 15890 | 1674 | 1.53 | 471 | 478 | −1316 | 11753 |
| middle | 3.02 | 0.34 | 3.14 | 11380 | 1663 | 1.40 | 466 | 471 | −1293 | 11941 |
| inner | 1.92 | 0.15 | 1.90 | 8820 | 1418 | 1.56 | 438 | 442 | −1516 | 19203 |

In Table 1, above, wall thickness is designated as "W.Thk.", tube length is "Ht", capacitance is "cap", dielectric constant is "K" is a measure of permitivity, dissipation factor is "df", and the piezoelectric output charge per unit of applied force d parameter is in "pC/N" (pico coulombs per newton).

While presently preferred embodiments have been shown of the novel actuator, and of the several modifications discussed, persons skilled in this art will readily appreciate that various additional changes and modifications may be made without departing from the spirit of the invention as defined and differentiated by the following claims.

What I claim:

1. A device comprising at least two piezoelectric members wherein one is an outer member and another is an inner member, said members being nested so that said inner member is disposed within said outer member, said members being radially spaced from each other, dipole moments in each member are aligned in the a direction by poling, electrodes are provided on said members, there are connecting structures between said members which results in displacements created by said device that are proportional to the total length of said members, and said inner member has a wall thickness that is thicker than that of said outer member.

2. The device of claim 1 wherein cross-sectional area of said inner and said outer mambers is about the same.

3. The device of claim 1 including a load associated with said device, the displacement acting on said load, and dipole moments in individual members are disposed in a direction opposite to the direction of the dipole moments in the adjacent members.

4. The device of claim 3 wherein said members are in the form of tubes and said electrodes are disposed at ends of each tube.

5. The device of claim 3 wherein said members are in the form of open-ended boxes and said electrodes are disposed at ends of each box.

6. The device of claim 3 wherein said members are in the form of tubes and said electrodes are disposed on the wall surfaces of each tube.

7. The device of claim 3 wherein said members are in the form of open-ended boxes and said electrodes are disposed on the wall surfaces of each box.

8. The device of claim 1 wherein said members are in the form of tubes and there is an odd number of tubes in said device with each tube being thicker than its neighboring tube in going from said inner to said outer tube.

9. The device of claim 2 including leads for transferring an electrical impulse from an external power supply to said individual members.

10. The device of claim 7 including a flat support on which said device is disposed in vertical disposition.

11. The device of claim 10 wherein said connecting structures are electrically inactive.

\* \* \* \* \*